418-242
Exar
May 12, 1936. M. R. HUTCHISON, JR Re. 19,962
COMPRESSOR orig. 1,142,425
Original Filed Jan. 21, 1933
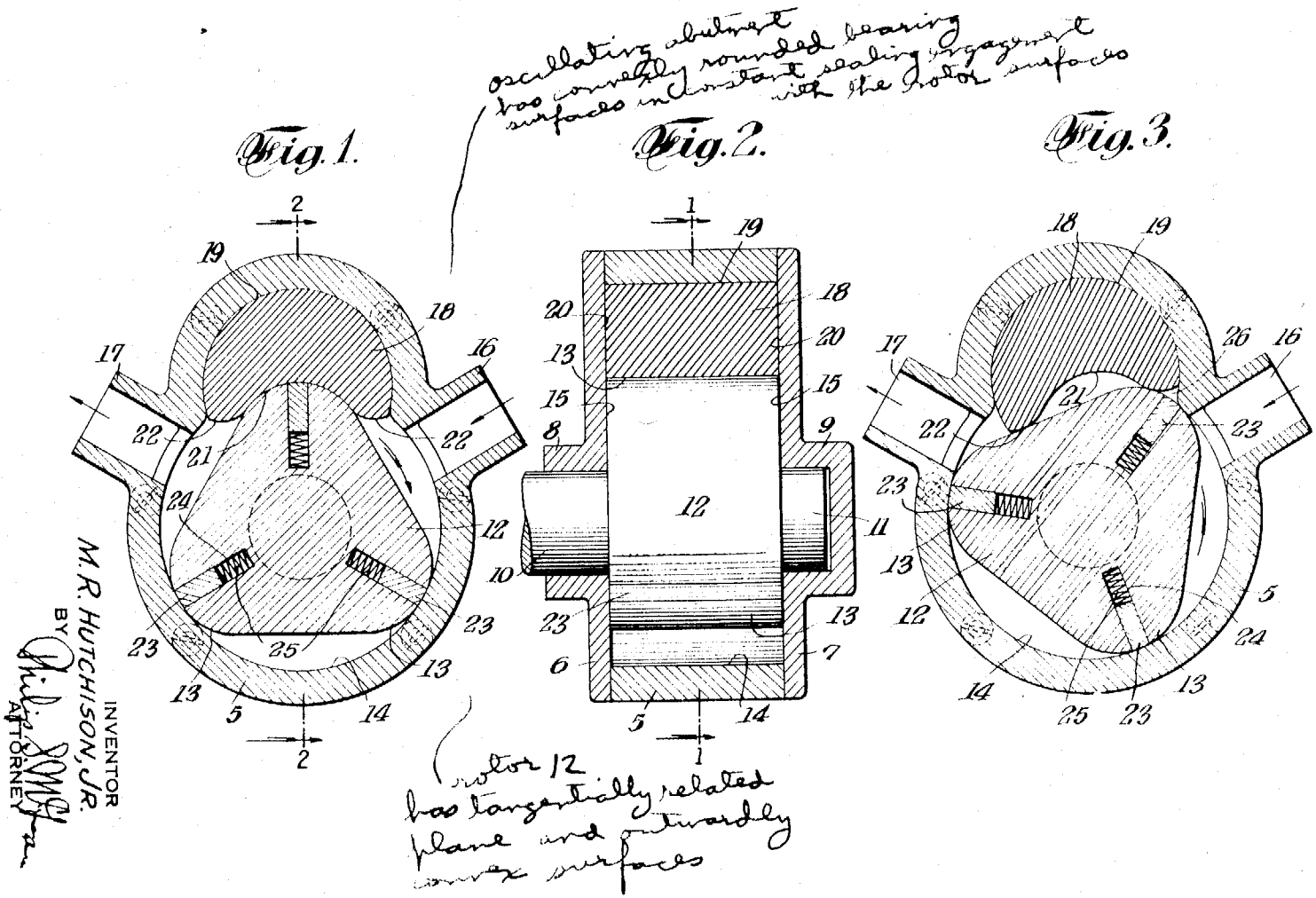
INVENTOR
M. R. HUTCHISON, JR.
BY Philip S. McGann
ATTORNEY

230 GAS PUMPS AND FANS
149

Reissued May 12, 1936 Re. 19,962

UNITED STATES PATENT OFFICE 19,962

COMPRESSOR

Miller R. Hutchison, Jr., Madison, N. J., assignor to Multicycol Pump & Engine Corporation, New York, N. Y., a corporation of New York Original No. 1,942,428, dated January 9, 1934, Serial No. 652,862, January 21, 1933. Application for reissue January 8, 1936, Serial No. 58,236

2 Claims. (Cl. 230—149)

The present invention relates to compressors and machines of like character.

The objects of the invention are to provide a positive displacement machine of large capacity for its size, consisting of but few and relatively simple parts, of rugged design and maintaining high efficiency with low frictional losses.

The novel features of construction, combinations and relations of parts by which the foregoing and other desirable objects are attained are set forth in the following specification and broadly covered in the claim.

In the drawing accompanying and forming part of the specification, one practical commercial embodiment of the invention has been illustrated, but as such is primarily for purposes of disclosure, it will be understood that the structure may be modified and changed as regards such disclosure, all within the true intent and broad scope of the invention.

Figs. 1 and 2 are vertical sectional views of a compressor embodying the invention, these views being taken on planes at right angles to each other, Fig. 1 as on the line 1—1 of Fig. 2 and Fig. 2 as on the line 2—2 of Fig. 1.

Fig. 3 is a view similar to Fig. 1, showing the rotor or impeller turned to a further position.

The machine illustrated comprises first a casing of generally cylindrical outline and made up of an intermediate body member 5, closed at opposite ends by plane faced end plates 6 and 7, carrying the bearings 8, 9, for the shaft portions 10, 11, of a cam-like impeller 12. One of the bearings, 8, is open to pass the shaft 10 for driving purposes.

The impeller is shown as of generally triangular formation with three equi-distant rounded lobes 13, in close fitting relation with the circular wall 14, of the intermediate chamber defining portion of the casing and with plane end faces 15, in sealing engagement with the flat inner faces of the end plates 6, 7.

A suitable inlet and outlet are provided, these being indicated at 16, 17, opening directly through the cylindrical wall of the intermediate casing member, at opposite sides of the impeller axis and spaced a distance approximately that of one of the plane sides of the cam member.

Separating the inlet and outlet is a sealing member in the form of a partly cylindrical rocker 18, journalled in a correspondingly cylindrical seat 19, formed as an extension or upward continuation of the cylindrical wall of the chamber. This seat and the rocker are both shown as of greater than semi-cylindrical form, so that the rocker will be definitely confined and held in its seat, even without the cam in place.

The ends of the rocker are shown as plane faces 20, in flat sealing engagement with the plane inside faces of the end plates of the casing.

The inner face of the rocker is hollowed on a curve 21, substantially conforming to and fitting the rounded lobes of the cam and from this concavity, the edges of the rocker are convexly rounded as at 22, to smoothly ride the rounded noses and flat sides of the impeller cam. If desired, packing strips 23, may be set in slots 24, in the noses of the cam and be backed up by springs 25, to assure close sealing relation between the cam, rocker and surrounding wall of the chamber. These resilient or resiliently mounted sealing strips may be designed so as to serve particularly for bridging the spaces at 26, Fig. 3, in the travel of the cam lobes from the rocker to the cylinder surfaces.

The rocker and the sealing strips may be formed of light, strong composition material, such as that known in the trade as "Micarta" or the like, or the same may be such as known to have so-called self-lubricating characteristics.

The action will be understood particularly from Figs. 1 and 3, where the arrows indicate the direction of rotation and the intake and expulsion of air, gas or other medium handled by the machine and where the operation will be seen to be one of positive displacement and transfer from inlet to outlet with the rocker and impeller serving at all times as a seal between inlet and outlet.

The form of the cam or impeller may vary and it may have a greater or less number of lobes than the three shown. Various other changes may be made all within the scope of the invention as will be apparent from the breadth of the claim.

The structure is such, that the machine may be produced at relatively low cost. The intermediate section of the casing is readily machined, since it consists simply of the cylindric chamber with the smaller cylindric bay extension for the rocker. The end plates may be machined substantially flat with sealing faces for the ends of the rocker and the ends of the impeller coextensive and all in the same plane. The three lobed cam is of symmetrical design and in extensive production may be made up in bar form, cut to the desired cam widths.

Various modifications may be made in the structure, to suit various requirements, all within the true intent of the invention, as will be apparent from the scope of the following claims.

What is claimed is:

1. A compressor or the like, comprising a casing having a generally cylindrical chamber with inlet and outlet and a partly cylindrical bearing seat intermediate the inlet and outlet offset from said cylindrical chamber on an axis parallel with the axis of the same, an impeller of symmetrical form rotating in said chamber and composed of tangentially related plane and outwardly convex surfaces and rotating with said outwardly convex surfaces in sealing relation with the surrounding cylindrical wall portion of the chamber, a partly cylindrical rocker seated with its cylindrical portion in said bearing and thereby journalled in the casing intermediate the inlet and outlet on a fixed axis parallel with the axis of rotation of the impeller and having a hollow face opposed to the impeller and terminating at opposite sides of the hollow in convexly rounded bearing surfaces in constant sealing engagement with the tangentially related outwardly convex and plane surfaces of the impeller and whereby said rocker is oscillated in opposite directions wholly by said impeller and continuously in doubly sealed relation therewith.

2. A compressor or the like, comprising a casing having a generally cylindrical chamber with inlet and outlet and a partly cylindrical bearing seat intermediate the inlet and outlet offset from said cylindrical chamber on an axis parallel with the axis of the same, a multi-lobed impeller of symmetrical form rotating in said chamber and composed of tangentially related plane and outwardly convex surfaces and rotating with said outwardly convex surfaces in sealing relation with the surrounding cylindrical wall portion of the chamber, a partly cylindrical rocker seated with its cylindrical portion in said bearing and journalled in the casing intermediate the inlet and outlet on a fixed axis parallel with the axis of rotation of the impeller and having a hollow face opposed to the impeller and terminating at opposite sides of the hollow in convexly rounded bearing surfaces in constant sealing engagement with the tangentially related outwardly convex and plane surfaces of the impeller and whereby said rocker is oscillated in opposite directions wholly by said impeller and continuously in doubly sealed relation therewith.

MILLER R. HUTCHISON, JR.